March 13, 1934.  O. R. WIKANDER  1,951,114
SHOCK ABSORBER
Filed March 17, 1930  2 Sheets-Sheet 1

Inventor
Oscar R. Wikander
John C. Carpenter
Atty.

March 13, 1934.   O. R. WIKANDER   1,951,114
SHOCK ABSORBER
Filed March 17, 1930   2 Sheets-Sheet 2

Inventor
Oscar R. Wikander
John C. Carpenter
Atty.

Patented Mar. 13, 1934

1,951,114

UNITED STATES PATENT OFFICE 1,951,114

SHOCK ABSORBER

Oscar R. Wikander, Pittsburgh, Pa., assignor to Edgewater Steel Company, Pittsburgh, Pa., a corporation of Pennsylvania Application March 17, 1930, Serial No. 436,286

5 Claims. (Cl. 213—29)

This invention relates to cushioning or shock absorbing devices and has more particular reference to devices of this character employing concentrically arranged ring spring elements having conical or inclined engaging faces adapted to slide upon each other upon compression of the spring with resultant stretching and compression of the ring elements. While the invention will be hereinafter described as embodied in a railway draft gear, it will be readily apparent that the invention has other valuable applications and uses.

It is desirable in many uses of such a cushioning or shock absorbing device to transmit the force to be cushioned in an easy and gradually increasing manner to a sturdy or stiff ring spring structure having great energy absorbing capacity and capable of sustaining and cushioning pressure forces, shocks and jars of more or less great intensity.

One object of the invention is to provide a cushioning or shock absorbing device which combines relatively soft precessional springs and relatively stiff backing springs, both of ring spring type, whereby a highly efficient and desirable soft starting and gradually increasing energy-absorbing action may be obtained.

A further and important object of the invention is the provision of a precessional spring which, while softly cushioning the impacts, shocks and jars, will be of sturdy and durable construction and fully capable of transmitting the pressure forces after compression to the relatively stiff backing spring.

Numerous other objects and advantages of the invention will be apparent as it is better understood from the following description, which, taken in connection with the accompanying drawings, discloses a preferred embodiment thereof.

Referring to the drawings.

Figure 1:
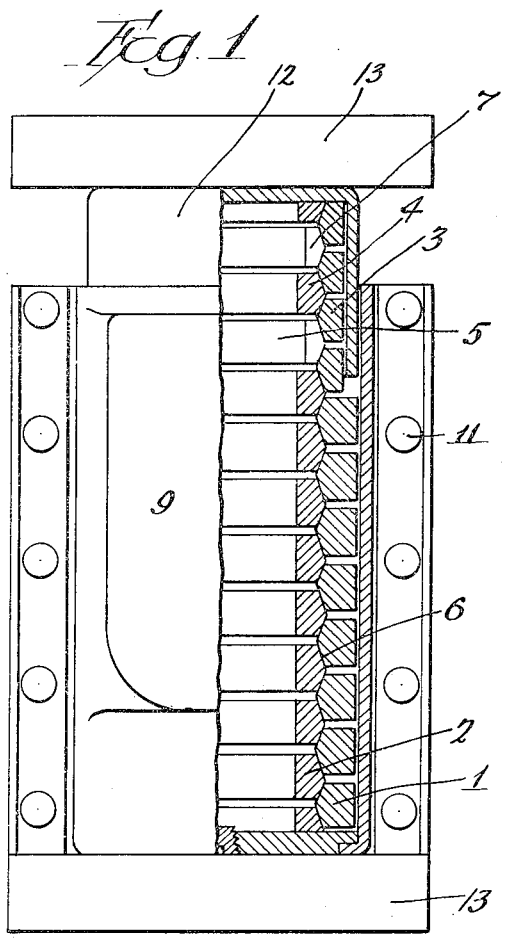
Figure 1 is a side elevation of a draft gear, parts being broken away and shown in section to disclose an embodiment of the invention.
Figure 2:
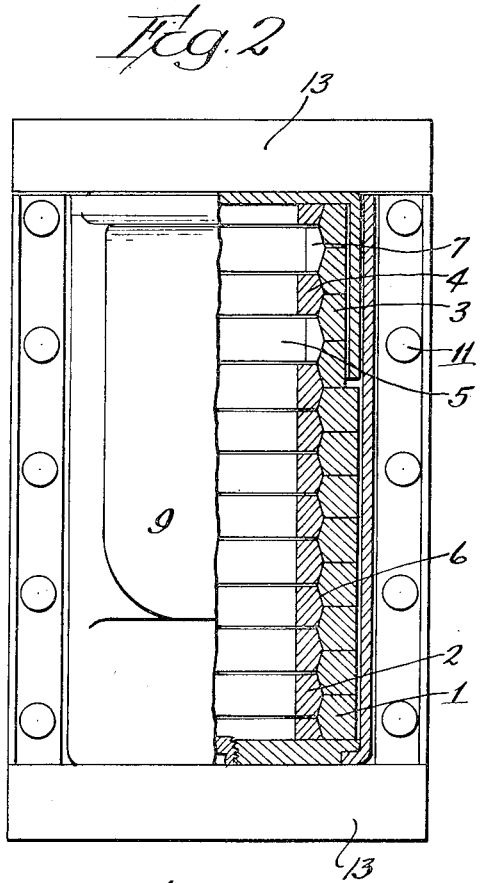
Fig. 2 is a similar view showing the parts fully compressed.
Figure 3:
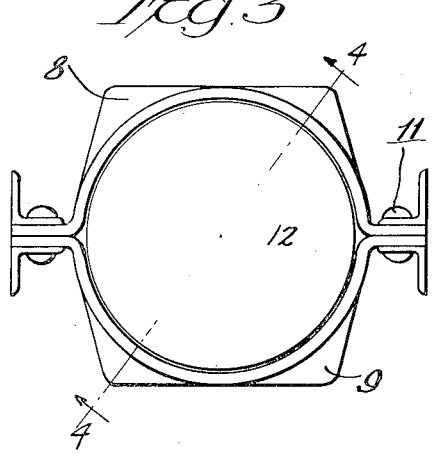
Fig. 3 is a top plan view of Fig. 1.
Figure 4:
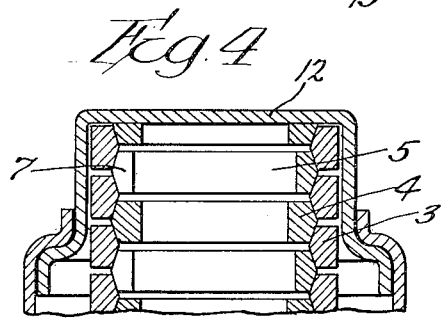
Fig. 4 is a partial section taken substantially on the line 4—4 of Fig. 3.
Figure 5:
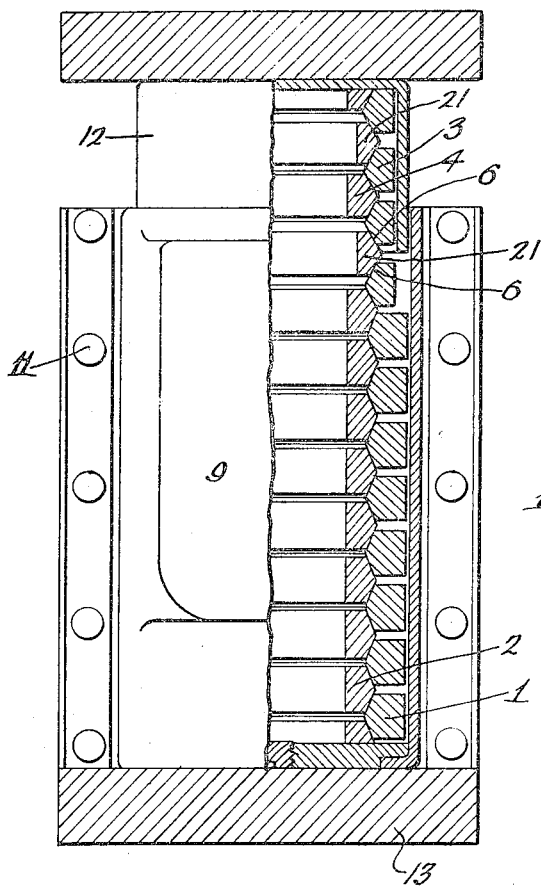
Figure 6:
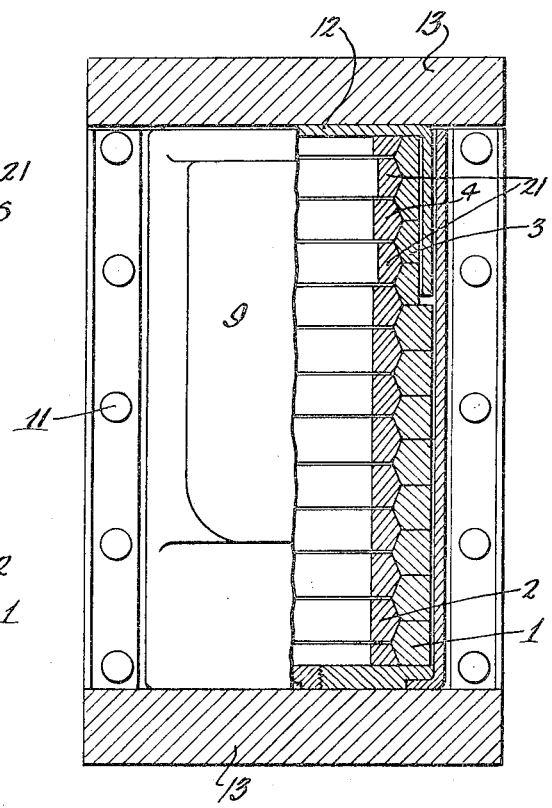
Figure 7:
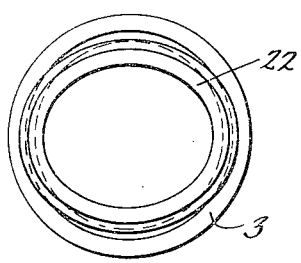
Figure 8:
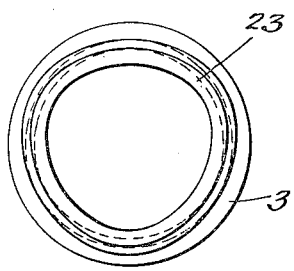

Figs. 5 and 6 are views similar to Figs. 1 and 2, and showing a second embodiment of the invention; and Figs. 7 and 8 are detailed plan views of non-circular rings adapted for incorporation in the precessional spring.

My invention generally contemplates the provision of a relatively stiff backing ring spring composed of a series of outer rings 1 and a series of inner rings 2, the members of the series 2 being alternately arranged with the series of outer rings 1, and the rings of the inner and outer series having interengaging conical faces 6. Upon compression of the spring these faces slide upon each other in wedging engagement, stretching and expanding the outer rings and compressing and contracting the inner rings.

In the embodiment of the invention shown in Figs. 1 to 4, the precessional spring comprises a series of outer rings 3, the members of which are shaped generally like the members of the series of rings 1 but of less radial thickness. The precessional spring comprises also a series of inner rings, certain members 5 and 7 of which are weaker or lighter in their spring action than certain other members 4 of the series. The members 4 may be and preferably are duplicates in all respects of the members of the inner series 2 of the heavier backing spring. In the embodiment of the invention shown in Figs. 1 to 4, the weaker members 5 and 7 are slotted transversely, all other rings of the assembly being integrally continuous.

The entire assembly is conveniently mounted in a casing composed of two pressed main members 8 and 9 joined together at their lateral edges by rivets or bolts 11 and a drawn sheet metal cap or shell 12 telescoping within the upper end of the part of the casing formed by the pressed members 8 and 9 and embracing the precessional spring. Reference characters 13 indicate the followers or abutments, one of which is fixed and the other adapted for approaching movement under impact.

Upon sustaining the force compressing the spring, the weaker inner rings 5 and 7 are first closed and thereafter the outer rings 3 are expanded and the inner rings 4 contracted, all finally into the compressed relation shown in Fig. 2. Continued movement under the pressure force causes expansion of the outer ring series 1 and contraction of the inner ring series 2 of the backing spring.

The weaker spring rings 5 are preferably arranged to alternate with the stiffer ring springs 4 so that each outer ring 3 engages both a weaker ring 5 and a stiffer ring 4, and all the outer rings 3 therefore sustain substantially the same expansion forces. In the compression of the ring 5, the form of the ring is changed by reduction of its diameter and before and after compression is a true circle.

The embodiment of the invention shown in Figs. 5 to 8 differs from that already described, in that non-circular rings, indicated in Figs. 5 and 6 by the reference character 21, are employed in place of the slotted rings 5 already described. The non-circular rings may have any preferred form, an oval shaped ring 22 being illustrated in Fig. 7 and a three-sided ring 23 being illustrated in Fig. 8.

The amount of metal in each of these rings is such that when they are brought to exact circular form, as will be presently described, they are only slightly less in diameter than the outer diameter of the relatively stiffer inner rings 4 of the precessional spring. When the spring is extended, as shown in Fig. 5, the non-circular rings engage the outer rings 3 only at the protruding parts of the non-circular rings. When compression occurs the engaging wedge faces round up the non-circular rings changing their form to that of a true circle and cushioning the initial spring action, both by the soft resistance to the change of shape and by an increased length of spring travel. Initially, the weaker spring rings separate the outer rings 3 contacting with them, in greater amount than do the relatively stiffer rings 4 of the precessional assembly.

It is thought that the invention and many of its attendant advantages will be understood from the foregoing description, and it will be apparent that various changes may be made in the form, construction and arrangement of the parts without departing from the spirt and scope of the invention or sacrificing all of its material advantages, the form hereinbefore described being merely a preferred embodiment thereof.

I claim:

1. A cushioning or shock absorbing device, comprising a stiff main backing spring of ring spring type, and a relatively weaker precessional spring of ring spring type, said last mentioned spring including a series of inner rings, alternate members of which are weaker than adjacent rings.

2. A ring spring assembly, comprising a series of outer rings and a series of inner rings, members of said series of inner rings being weaker than other members of said series, the rings of said inner series being so arranged that members of the series of outer rings each engage a relatively weak and a relatively stiff inner ring.

3. A ring spring assembly, comprising a series of inner and outer rings alternately arranged and frictionally engaging at presented faces, and a weaker precessional ring spring comprising inner and outer alternately arranged rings, said last mentioned inner rings being composed of rings substantially the stiffness of rings of the first mentioned series, and of rings weaker than rings of the first mentioned series.

4. A ring spring assembly, comprising a series of outer rings and a series of inner rings alternately arranged, the one inner series being composed of relatively stiff and relatively weak rings, rings of the outer series being arranged in the assembly to each engage a stiffer and a weaker inner ring.

5. A ring spring assembly, comprising two sets of ring springs, each set consisting of an inner and an outer series of rings, alternate members of the inner series of one set being weakened, and the members of the companion outer series being of less external diameter than the external diameter of the outer rings of the other set, and adapted to be expanded in pairs as units at the end of the spring compression.

OSCAR R. WIKANDER.